United States Patent
Matsushita et al.

(10) Patent No.: US 7,796,949 B2
(45) Date of Patent: Sep. 14, 2010

(54) WIRELESS COMMUNICATIONS TERMINAL, COMMUNICATIONS PROTOCOL SWITCHING METHOD, COMMUNICATIONS PROTOCOL SWITCHING PROGRAM, AND INTEGRATED CIRCUIT OF WIRELESS COMMUNICATIONS TERMINAL

(75) Inventors: Yuka Matsushita, Higashihiroshima (JP); Tadakatsu Masaki, Urasoe (JP); Eiji Ueda, Kure (JP)

(73) Assignee: Panasonic Corporation, Osaka (JP)

( * ) Notice: Subject to any disclaimer, the term of this patent is extended or adjusted under 35 U.S.C. 154(b) by 317 days.

(21) Appl. No.: 10/553,008

(22) PCT Filed: May 2, 2005

(86) PCT No.: PCT/JP2005/008660

§ 371 (c)(1),
(2), (4) Date: Oct. 11, 2005

(87) PCT Pub. No.: WO2005/114857

PCT Pub. Date: Dec. 1, 2005

(65) Prior Publication Data
US 2006/0234778 A1    Oct. 19, 2006

(30) Foreign Application Priority Data
May 21, 2004    (JP)    .............................. 2004-151271

(51) Int. Cl.
*H04B 1/00*    (2006.01)
(52) U.S. Cl. .................... 455/63.1; 455/78; 455/114.2; 455/295
(58) Field of Classification Search ................ 455/565, 455/558, 566, 557, 550.1, 296, 63.1, 41.2
See application file for complete search history.

(56) References Cited

U.S. PATENT DOCUMENTS

| 5,291,193 | A  | * | 3/1994  | Isobe et al. | ............ | 340/825.69 |
| 6,470,085 | B1 | * | 10/2002 | Uranaka et al. | ............. | 380/231 |
| 6,489,883 | B1 | * | 12/2002 | Iiyama et al. | ................. | 340/5.1 |
| 6,687,350 | B1 | * | 2/2004  | Landry et al. | .......... | 379/144.04 |
| 6,729,550 | B2 | * | 5/2004  | Seita et al. | .................. | 235/492 |
| 6,898,445 | B2 | * | 5/2005  | Slettengren et al. | ......... | 455/567 |
| 6,973,327 | B2 | * | 12/2005 | Seita | ....................... | 455/550.1 |
| 7,031,662 | B2 | * | 4/2006  | Suzuki et al. | .............. | 455/63.1 |

(Continued)

FOREIGN PATENT DOCUMENTS

CN    1416228    5/2003

(Continued)

*Primary Examiner*—Duc Nguyen
*Assistant Examiner*—Ajibola Akinyemi
(74) *Attorney, Agent, or Firm*—Wenderoth, Lind & Ponack, L.L.P.

(57) ABSTRACT

A wireless communications terminal prevents radio interferences caused by other wireless communications concurrent with a contactless communication. A wireless communications terminal receives, in a contactless communication, a command from a reader/writer via a second wireless communications section, and analyzes the received command. The wireless communications terminal controls a wireless communications control section to deactivate or temporarily deactivate the function of a first wireless communications section depending on the analysis of the command. After the function of the first wireless communications section is deactivated or temporarily deactivated, the wireless communications terminal accesses a memory area of an IC card microcomputer system as specified by the command to perform a contactless communication.

5 Claims, 17 Drawing Sheets

U.S. PATENT DOCUMENTS

| | | | |
|---|---|---|---|
| 7,031,945 B1 * | 4/2006 | Donner | 705/64 |
| 7,231,202 B2 * | 6/2007 | Natsuno | 455/410 |
| 2002/0002582 A1 * | 1/2002 | Ewing et al. | 709/202 |
| 2002/0037714 A1 * | 3/2002 | Takae et al. | 455/419 |
| 2002/0040308 A1 * | 4/2002 | Hasegawa et al. | 705/5 |
| 2002/0065070 A1 * | 5/2002 | Naiki | 455/419 |
| 2002/0082002 A1 * | 6/2002 | Fujii | 455/419 |
| 2002/0119788 A1 * | 8/2002 | Parupudi et al. | 455/456 |
| 2002/0170975 A1 * | 11/2002 | Kawano et al. | 235/492 |
| 2002/0177407 A1 * | 11/2002 | Mitsumoto | 455/41 |
| 2003/0045328 A1 * | 3/2003 | Natsuno | 455/558 |
| 2003/0045333 A1 * | 3/2003 | Kimata et al. | 455/574 |
| 2003/0078076 A1 | 4/2003 | Kuwajima et al. | |
| 2003/0109218 A1 * | 6/2003 | Pourkeramati et al. | 455/3.05 |
| 2003/0141989 A1 * | 7/2003 | Arisawa et al. | 340/870.01 |
| 2003/0174839 A1 * | 9/2003 | Yamagata et al. | 380/270 |
| 2003/0228892 A1 * | 12/2003 | Maalismaa et al. | 455/575.7 |
| 2004/0030761 A1 * | 2/2004 | Takeuchi et al. | 709/220 |
| 2004/0058705 A1 * | 3/2004 | Morgan et al. | 455/556.1 |
| 2004/0072592 A1 * | 4/2004 | Hasegawa | 455/558 |
| 2004/0185830 A1 * | 9/2004 | Joao et al. | 455/410 |
| 2004/0209650 A1 * | 10/2004 | Pearce | 455/558 |
| 2006/0095454 A1 * | 5/2006 | Shankar et al. | 707/101 |
| 2006/0234778 A1 * | 10/2006 | Matsushita et al. | 455/565 |

FOREIGN PATENT DOCUMENTS

| | | |
|---|---|---|
| CN | 1486474 | 3/2004 |
| EP | 1 413 979 | 4/2004 |
| EP | 1413979 A1 * | 4/2004 |
| GB | 2 384 942 | 8/2003 |
| JP | 2004-151271 | 5/2004 |
| JP | 2004-222198 | 8/2004 |
| WO | 02/056247 | 7/2002 |

* cited by examiner

FIG. 4
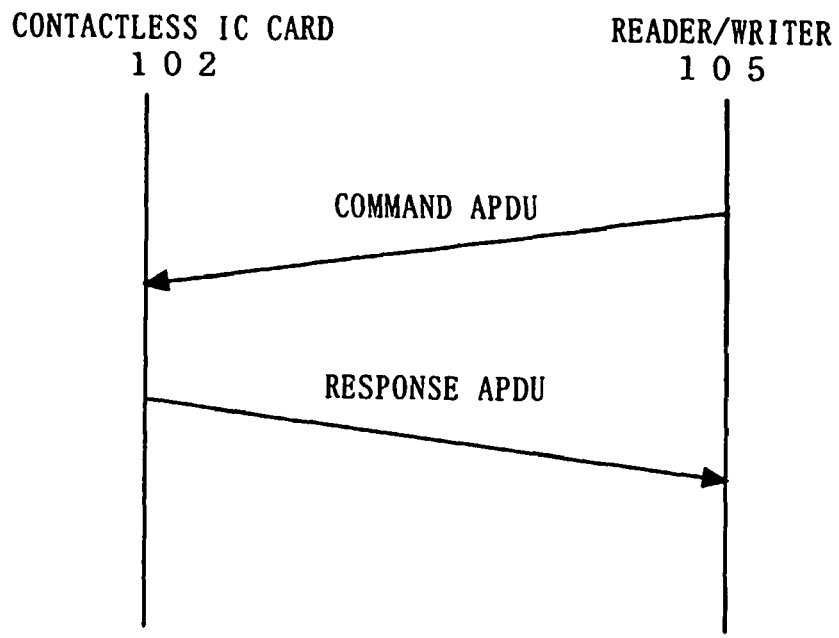
FIG. 5
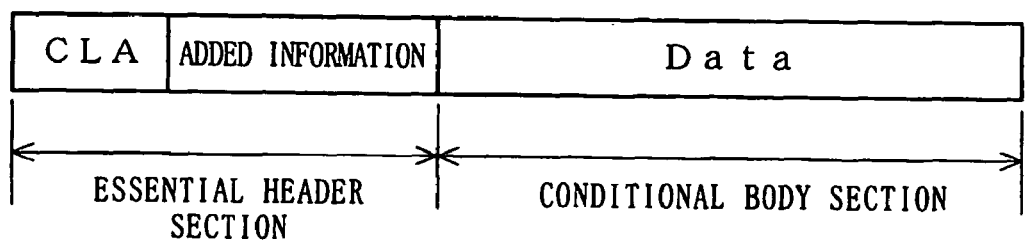
FIG. 6
| CLA | | | | | | | | MEANING |
|---|---|---|---|---|---|---|---|---|
| b8 | b7 | b6 | b5 | b4 | b3 | b2 | b1 | |
| 0 | 0 | 0 | 0 | | | | | COMMON COMMAND |
| 1 | 0 | 0 | 0 | | | | | UNIQUE COMMAND |

FIG. 7

| SECURITY LEVEL | GROUP OF NON-VOLATILE MEMORIES | VALUE | CLA | | |
|---|---|---|---|---|---|
| | | | b3 | b2 | b1 |
| HIGH | TRM AREA | 03h | 0 | 1 | 1 |
| MEDIUM | SECURE FLASH | 02h | 0 | 1 | 0 |
| LOW | GENERAL AREA | 01h | 0 | 0 | 1 |

FIG. 8

| CLA | b4 |
|---|---|
| READ | 0 |
| WRITE | 1 |

FIG. 9

| COMMAND | CLA | | | | | | | | VALUE |
|---|---|---|---|---|---|---|---|---|---|
| | b8 | b7 | b6 | b5 | b4 | b3 | b2 | b1 | |
| TRM AREA | 1 | 0 | 0 | 0 | 0 | 0 | 1 | 1 | 83h |
| SECURE FLASH | 1 | 0 | 0 | 0 | 1 | 0 | 1 | 0 | 8ah |
| GENERAL AREA | 1 | 0 | 0 | 0 | 0 | 0 | 0 | 1 | 81h |

FIG. 10A
| COMMAND | CLA VALUE | ADDED INFORMATION | Data | | | |
|---|---|---|---|---|---|---|
| | | | Len | Offset | Size | ACTUAL DATA |
| TRM AREA | 83h | XXh | 04h | 4000h | 0fh | 00h |
| SECURE FLASH | 8ah | XXh | 23h | 1200h | 20h | XXh |
| GENERAL AREA | 81h | XXh | 04h | 8030h | 30h | 00h |
FIG. 10B
TRM AREA
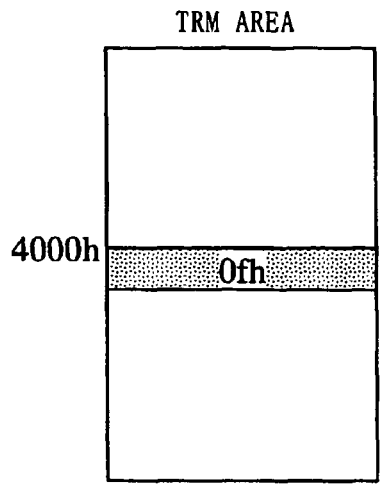
FIG. 10C
SECURE FLASH
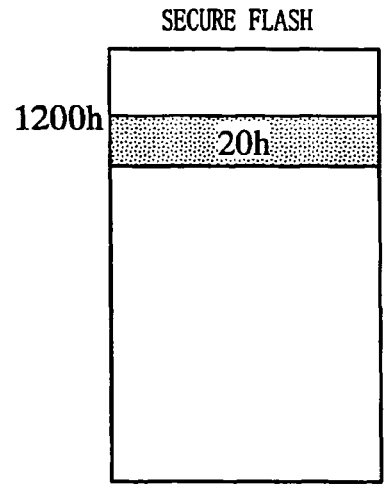
FIG. 10D  GENERAL AREA
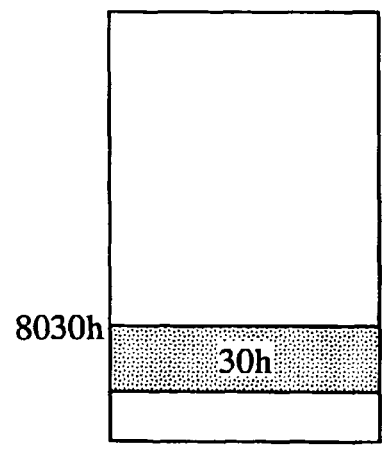

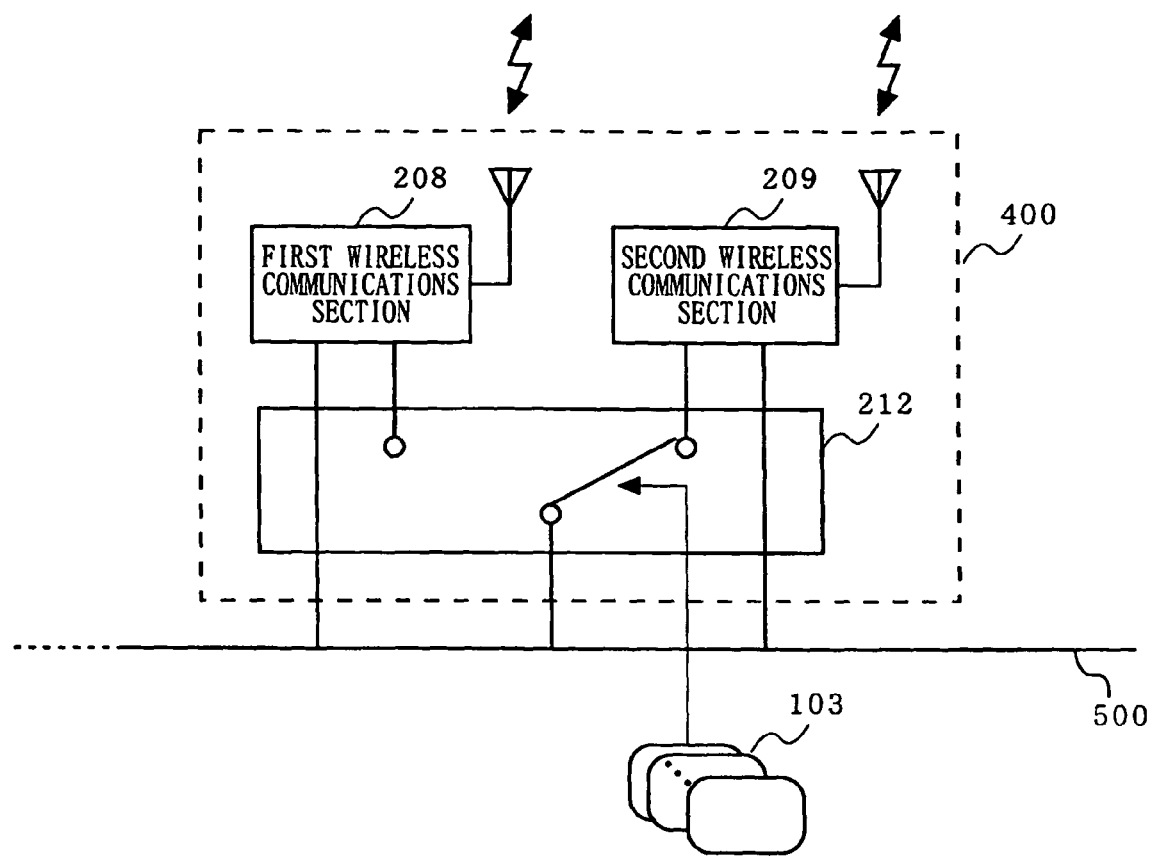
F I G. 2 0

WIRELESS COMMUNICATIONS TERMINAL, COMMUNICATIONS PROTOCOL SWITCHING METHOD, COMMUNICATIONS PROTOCOL SWITCHING PROGRAM, AND INTEGRATED CIRCUIT OF WIRELESS COMMUNICATIONS TERMINAL

TECHNICAL FIELD

The present invention relates to a wireless communications terminal capable of performing a contactless communications and a wireless communications. More particularly, the present invention relates to a wireless communications terminal capable of restricting a particular wireless communications function that may cause radio interferences with a contactless communications, and a communications protocol switching method used by such a wireless communications terminal.

BACKGROUND ART

Recently, there is a system where an IC chip storing information therein is provided in a wireless communications terminal such as a mobile telephone, so that the holder of the mobile telephone can pass through an automatic ticket gate while establishing a contactless communications between the IC chip and a reader/writer in the automatic ticket gate via the mobile telephone.

It is expected that a wireless communications terminal will be provided with a plurality of wireless communications functions in the future. Examples of wireless communications functions include PDC, W-CDMA, Bluetooth, GPS (Global Positioning System), wireless LAN, UWB (Ultra Wide Band), wireless tag, radio, TV, etc. These wireless communications functions use frequency bands as follows: PDC uses 800 MHz/1.5 MHz/1.9 MHz, W-CDMA 2 GHz, Bluetooth 2.4 GHz, GPS 1.57 GHz, wireless LAN 2.4 GHz/5 GHz, UWB 1.5 GHz or higher, wireless tag 135 kHz/13.56 MHz/860 to 960 MHz/2.45 GHz, radio 0.531 to 1.602 MHz/76.0 to 90.0 MHz, and TV 95.75 to 107.75 MHz/175.75 to 221.75 MHz/475.75 to 769.75 MHz.

If these wireless communications functions are provided in a single wireless communications terminal, it is likely that there will be radio interferences between different communications sections. For example, if a mobile telephone receives a call when the holder of the mobile telephone is passing through an automatic ticket gate and a contactless communications has been established, a radio interference may occur, whereby the ticket data may not be exchanged properly.

In order to avoid radio interferences, a conventional technique employs a structure in a mobile telephone in which a wireless communications section and a contactless communications section are spaced apart from each other as much as possible. With such a structure, there will less likely be radio interferences caused by other wireless communications concurrent with a contactless communications.

DISCLOSURE OF THE INVENTION

With this conventional structure, however, it is not possible to completely eliminate radio interferences caused by other wireless communications concurrent with a contactless communications. Therefore, this structure cannot be employed for highly secure communications systems. For example, it cannot be employed for a communications system where electronic money is exchanged between a mobile telephone and an automatic ticket gate. Moreover, with this conventional structure, the likelihood of radio interferences is reduced to the same degree, irrespective of the type of information to be exchanged in a contactless communications. Therefore, it is not suitable for cases where the degree to which the likelihood of radio interferences is reduced should be variable depending on the type of information to be exchanged in a contactless communications.

Therefore, an object of the present invention is to provide a wireless communications terminal capable of restricting other wireless communications depending on the information to be exchanged in a contactless communications so as to prevent radio interferences from being caused by other wireless communications concurrent with the contactless communications.

The present invention is directed to a wireless communications terminal capable of performing a contactless communications and at least one wireless communications. In order to attain the object mentioned above, the wireless communications terminal of the present invention includes: a first wireless communications section operable to perform a wireless communications other than a contactless communications; a second wireless communications section operable to perform a contactless communications; and a wireless communications control section operable to restrict a wireless communications performed by the first wireless communications section based on a status of a contactless communications performed by the second wireless communications section.

Typically, the wireless communications control section starts restricting a wireless communications performed by the first wireless communications section in response to an initiation of a contactless communications by the second wireless communications section. It is preferred that the wireless communications control section deactivates or temporarily deactivates a wireless communications function of the first wireless communications section based on a security level of information exchanged in a contactless communications performed by the second wireless communications section. In one embodiment of the present invention, the wireless communications control section may vary stepwise an output radio wave intensity in a wireless communications performed by the first wireless communications section according to a security level of information exchanged in a contactless communications performed by the second wireless communications section.

Where the second wireless communications section performs a contactless communications between a semiconductor memory card inserted in the wireless communications terminal and a predetermined reader/writer, the wireless communications control section can determine the security level of information based on a security level of a memory management area, in the semiconductor memory card, storing the information exchanged in a contactless communications performed by the second wireless communications section. The memory management area in the semiconductor memory card may include at least one of a TRM area, a secure flash and a general area. If the wireless communications terminal further includes a timer section operable to detect an elapse of a predetermined amount of time since an initiation of a contactless communications, the wireless communications control section can lift the restriction on the first wireless communications section based on the detection of an elapse of the predetermined time by the timer section.

In one embodiment of the present invention, the wireless communications control section starts restricting a wireless communications performed by the first wireless communications section based on an instruction from a user. It is preferred that the wireless communications control section deactivates or temporarily deactivates a wireless communications function of the first wireless communications section based on an instruction from a user. The wireless communications terminal may further include a second wireless communications control section operable to restrict a contactless communications performed by the second wireless communications section based on an instruction from the user. Based on an instruction from the user, the wireless communications control section may also restrict a contactless communications performed by the second wireless communications section in such a manner that either one of the contactless communications and the wireless communications is restricted at a time. If the wireless communications terminal further includes a timer section operable to detect an elapse of a predetermined amount of time since an initiation of a contactless communications, the wireless communications control section can lift the restriction on the first wireless communications section based on the detection of an elapse of the predetermined time by the timer section.

The process performed by the wireless communications control section of the wireless communications terminal set forth above may be regarded as a communications protocol switching method. The method may be provided in the form of a program for instructing a computer to perform various steps involved in the process. The program may be introduced into a computer in the form of a computer-readable recording medium storing the program. The functional block of the wireless communications control section of the wireless communications terminal set forth above may be implemented in the form of an LSI being an integrated circuit.

According to the present invention as described above, when a contactless communications is performed, other wireless communications are restricted based on the type of information to be exchanged in the contactless communications. Thus, it is possible to prevent radio interferences from being caused by other wireless communications concurrent with a contactless communications. The user can manually disable a communications function via the button input section of the wireless communications terminal so as to disable wireless communications other than the contactless communications while enabling the contactless communications. Therefore, it is possible to selectively establish only a contactless communications, thus preventing radio interferences.

BRIEF DESCRIPTION OF THE DRAWINGS

FIG. 4 shows an example of a contactless communications established between a contactless IC card and a reader/writer;

FIG. 5 shows a data structure of a command APDU;

FIG. 6 shows an example of how a class byte (CLA) is used;

FIG. 7 shows an example of security level assignment;

FIG. 8 shows an example of how a class byte (CLA) is used;

FIG. 9 shows an example of how a class byte (CLA) is used;

FIG. 10A shows an example of how a command APDU is used;

FIG. 10B shows in detail a command shown in FIG. 10A;

FIG. 10C shows in detail a command shown in FIG. 10A;

FIG. 10D shows in detail a command shown in FIG. 10A;

FIG. 20 shows a part of a hardware configuration of the wireless communications terminal of the fourth embodiment;

BEST MODE FOR CARRYING OUT THE INVENTION

The present invention is applicable to any wireless communications terminal capable of performing a contactless communications and at least one other wireless communications. The present invention is particularly advantageous in cases where a plurality of types of information of different security levels are exchanged in contactless communications.

Embodiments of the present invention will now be described where security information is exchanged in a contactless communications established between a reader/writer and a mobile telephone capable of accommodating therein a contactless semiconductor memory card, e.g., an IC card, storing security information as a wireless communications terminal.

First Embodiment

Figure 1:
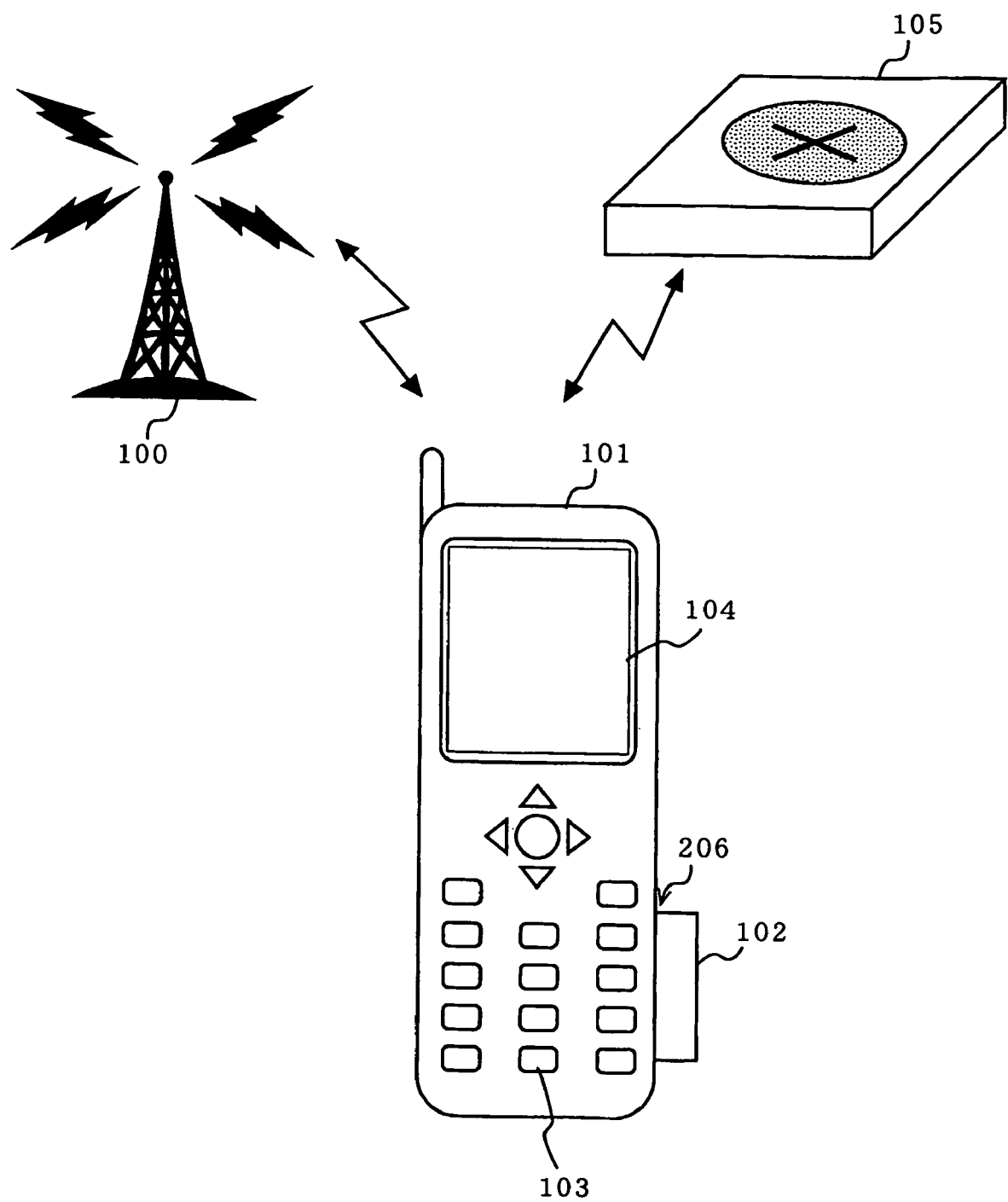
FIG. 1 is a conceptual diagram showing a wireless communications system using a wireless communications terminal according to a first embodiment of the present invention.

FIG. 1 is a conceptual diagram showing a wireless communications system using a wireless communications terminal 101 according to a first embodiment of the present invention. The wireless communications system shown in FIG. 1 includes the wireless communications terminal 101, a relay station 100 and a reader/writer 105. The wireless communications terminal 101 has both a contactless communications function and a mobile telephone communications function. The relay station 100 establishes a mobile telephone communications with the wireless communications terminal 101. The reader/writer 105 establishes a contactless communications with the wireless communications terminal 101. The reader/writer 105 is provided in, for example, an automatic ticket gate at a train station or a cash register in a convenience store.

The wireless communications terminal 101 includes a plurality of buttons 103, a display section 104 and a card slot 206. The wireless communications terminal 101 can accommodate a contactless IC card 102 in the card slot 206. With the contactless IC card 102 inserted in card slot 206, the wireless communications terminal 101 can establish a contactless communications with the reader/writer 105.

Figure 2:
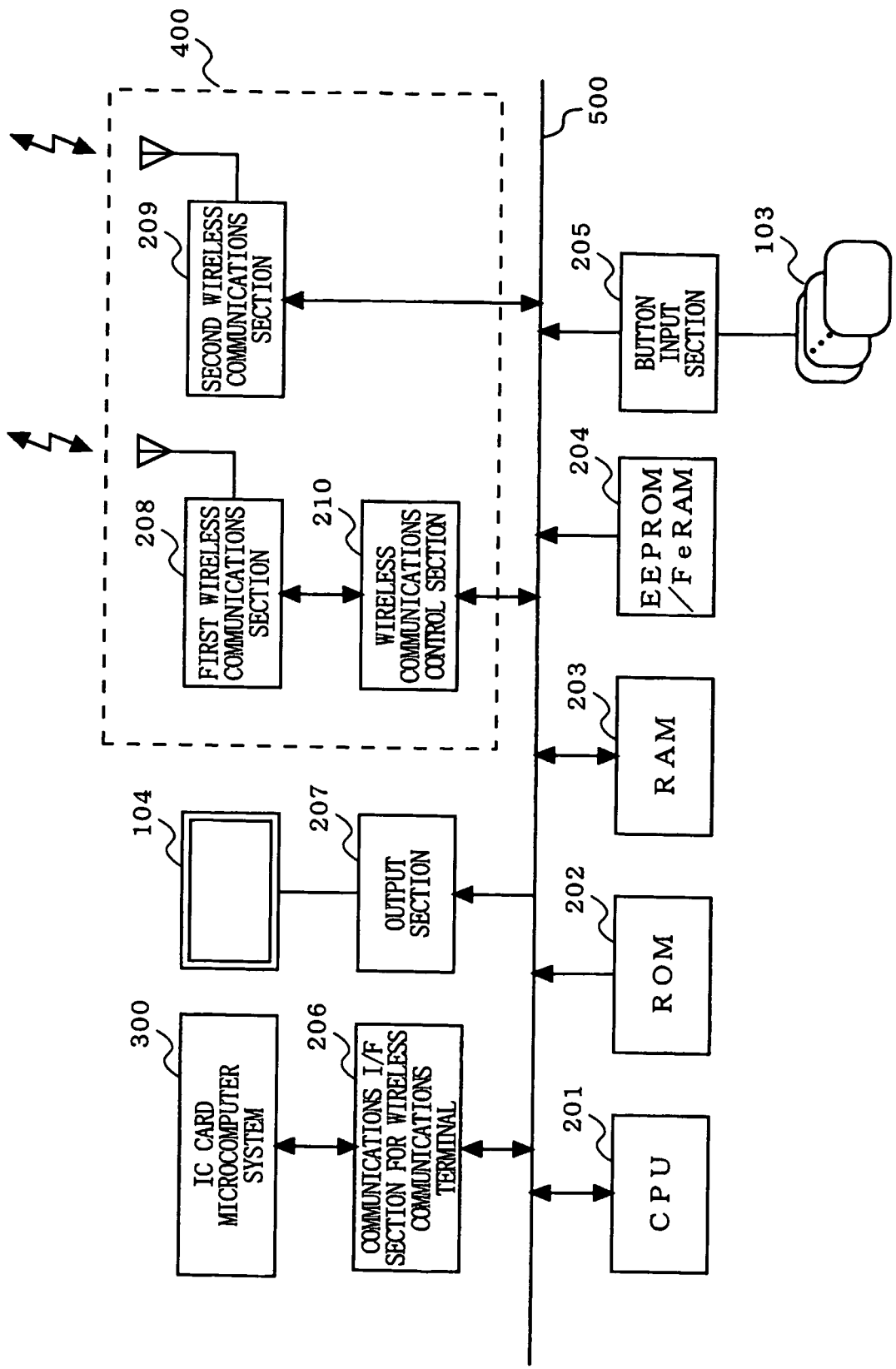
FIG. 2 shows a hardware configuration of the wireless communications terminal of the first embodiment.

FIG. 2 shows a hardware configuration of the wireless communications terminal 101 of the first embodiment. The wireless communications terminal 101 includes a CPU 201, a ROM 202, a RAM 203, an EEPROM/FeRAM 204, a button input section 205, a communications I/F section 206 for a wireless communications terminal, an output section 207, an IC card microcomputer system 300 and a communications function section 400, which are connected to one another via a bus 500.

The communications function section 400 includes a first wireless communications section 208 for performing a mobile telephone communications, a second wireless communications section 209 for performing a contactless communications, and a wireless communications control section 210 for controlling the communications status of the first wireless communications section 208. The CPU 201 performs arithmetic operations, etc. The ROM 202 stores programs. The RAM 203 stores temporary data. The EEPROM/FeRAM 204 stores data. The button input section 205 detects pressing of the buttons 103 by the user. The communications I/F section 206 for a wireless communications terminal corresponds to the card slot 206. The IC card microcomputer system 300 corresponds to the contactless IC card 102. The output section 207 gives a video output to the display section 104.

Figure 3:
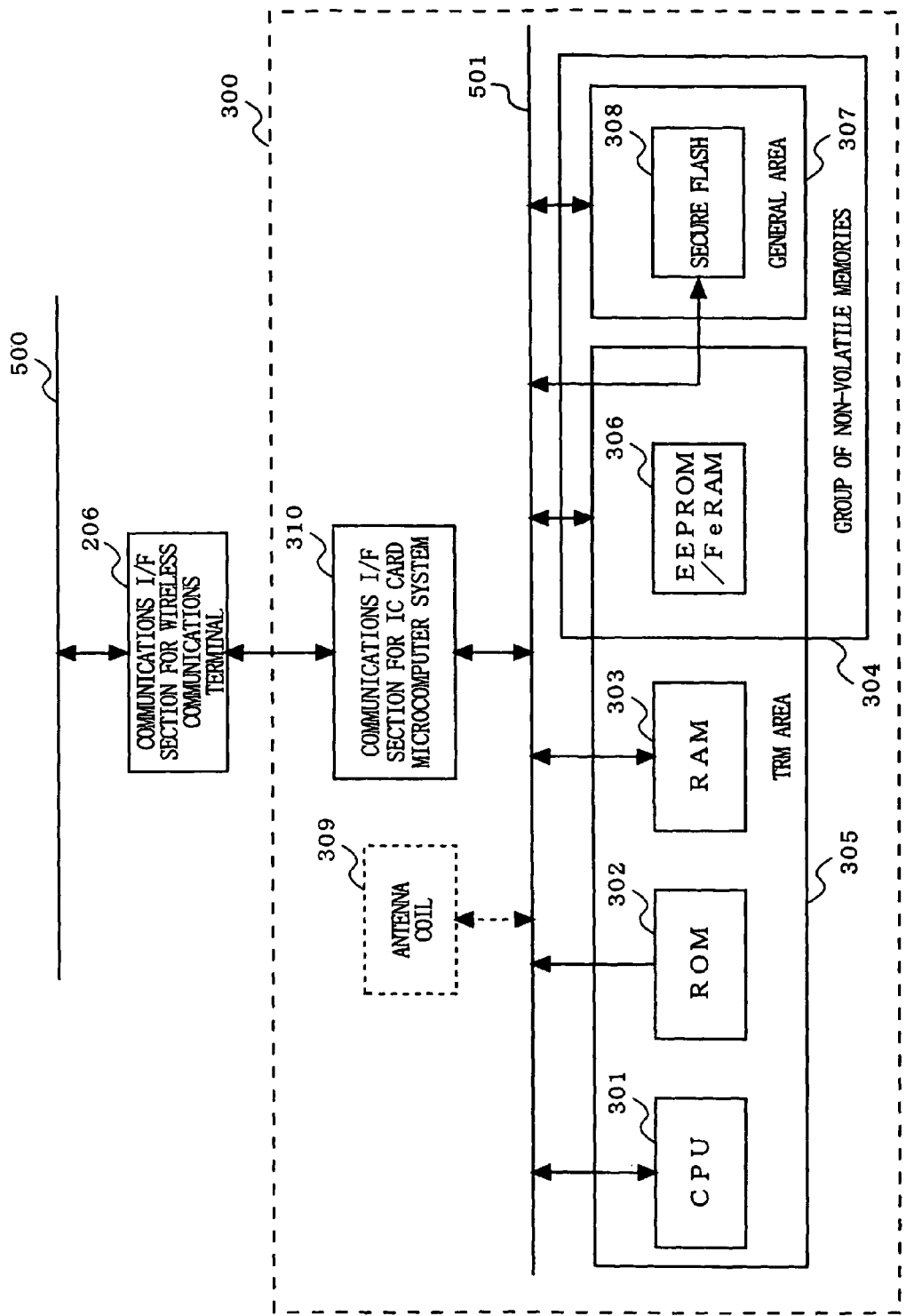
FIG. 3 shows a detailed hardware configuration of an IC card microcomputer system shown in FIG. 2.

FIG. 3 shows a detailed hardware configuration of the IC card microcomputer system 300 shown in FIG. 2. The IC card microcomputer system 300 includes a CPU 301, a ROM 302, a RAM 303, a group of non-volatile memories 304 and a communications I/F section 310 for an IC card microcomputer system, which are connected to one another via a bus 501. The IC card microcomputer system 300 may optionally include an antenna coil 309 in a case where the IC card microcomputer system 300 directly performs a contactless communications.

The CPU 301 performs arithmetic operations, etc. The ROM 302 stores programs. The RAM 303 stores temporary data. The group of non-volatile memories 304 includes an FeRAM 306 present in a TRM area 305 and a secure flash 308 present in a general area 307. The TRM area 305, the secure flash 308 and the general area 307 are memory management areas each having an independent security level. The TRM area 305 is tamper-resistant and has a highest security level. In the IC card microcomputer system 300, the CPU 301, the ROM 302 and the RAM 303 also belong to the TRM area 305. The secure flash 308 is a flash memory using a TRM function.

A wireless communications protocol used in a wireless communications system using the above-described wireless communications terminal 101 will now be described.

A contactless communications between the contactless IC card 102 and the reader/writer 105 is performed by transmitting a command application protocol data unit (command APDU) from the reader/writer 105 to the contactless IC card 102 and returning a response APDU from the contactless IC card 102 to the reader/writer 105, as shown in FIG. 4.

FIG. 5 shows a data structure of a command APDU. A command APDU includes an essential header section storing a class byte (CLA) and additional information, and a conditional body section. A CLA stored in the essential header section includes eight bits, wherein the bits b5 to b8 all being "0" indicates that the command. APDU is a common command and the bits b5 to b7 being "0" with the bit b8 being "1" indicates that the command APDU is a unique command, as shown in FIG. 6. A common command as used herein refers to a basic command defined in an IC card protocol specified in the ISO7816-4 standard. A unique command as used herein refers to an undefined extended command.

In the present invention, a unique command is newly defined as will be described below so that other wireless communications can be controlled based on the type of information to be exchanged in a contactless communications.

Different security levels are assigned to different areas of the IC card microcomputer system 300 where various information are stored. FIG. 7 shows an example of security level assignment. In the example shown in FIG. 7, the TRM area 305 is assigned a highest security level, the secure flash 308a lower security level, and the general area 307 a lowest security level. These areas can be identified from one another by using the lower bits b3 to b1 of the CLA of the command APDU as shown in FIG. 7. An instruction to read information from an identified area and an instruction to write information therein can be differentiated from each other by using the bit b4 of the CLA of the command APDU as shown in FIG. 8.

FIG. 9 shows an example of a CLA as described above, and FIG. 10A to FIG. 10D each show an example of a unique command using the CLA. The first record in FIG. 10A is a command APDU instructing to read data of a size "0fh" starting from a position at an offset "4000h" in the TRM area 305 (see FIG. 10B). The second record is a command APDU instructing to write data of a size "20h" starting from a position at an offset "1200h" in the secure flash 308 (see FIG. 10C). The third record is a command APDU instructing to read data of a size "30h" starting from a position at an offset "8030h" in the general area 307 (see FIG. 10D).

Figure 11:
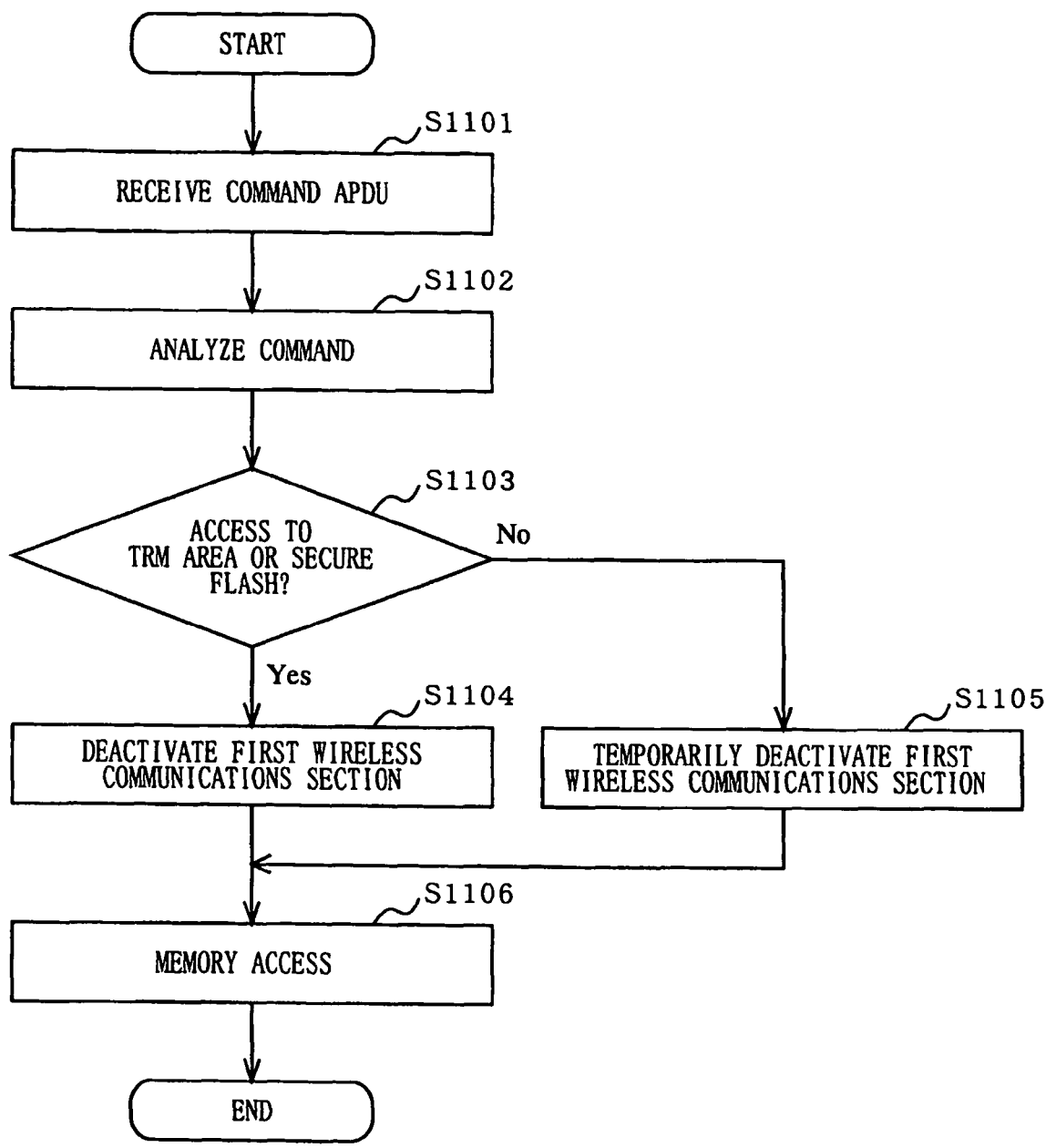
FIG. 11 is a flow chart showing a process performed by the wireless communications terminal of the first embodiment based on a received command APDU.

FIG. 11 is a flow chart showing a process performed by the wireless communications terminal 101 of the first embodiment based on a received command APDU.

The wireless communications terminal 101 receives a command APDU from the reader/writer 105 via the second wireless communications section 209 (step S1101), and analyzes the received command APDU to determine which area the command is requesting to access by referring to the CLA of the command (step S1102). If the analysis indicates that the command is requesting to access the TRM area 305 or the secure flash 308 (Yes in step S1103), the wireless communications terminal 101 controls the wireless communications control section 210 to deactivate the first wireless communications section 208 (step S1104). Deactivation as used herein means deactivating a function in such a manner that the function will not later be reactivated automatically, i.e., blocking or prohibiting the wireless communications function. Deactivation is used in order to ensure normal completion of a contactless communications that involves highly confidential information stored in the TRM area 305 or the secure flash 308. If the command is requesting to access the general area 307 (No in step S1103), the wireless communications terminal 101 controls the wireless communications control section 210 to temporarily deactivate the first wireless communications section 208 (step S1105). Temporary deactivation as used here in means deactivating a function in such a manner that the function will later be reactivated automatically. Temporary deactivation is used in order to place an increased priority on the completion of a contactless communications that involves information stored in the general area 307, or the like. The reactivation can be realized by using a timer, for example. After the deactivation or temporary deactivation of the first wireless communications section 208, the wireless communications terminal 101 accesses a memory area of the IC card microcomputer system 300 as specified by the command to perform a contactless communications (step S1106).

Note that how the function of the first wireless communications section 208 is restricted is not limited to that described above. For example, the function of the first wireless communications section 208 may be temporarily deactivated even if the received command APDU is requesting to access the secure flash 308. The number of security levels to be used is also not limited to three. The function of the first wireless communications section 208 may alternatively be restricted by decreasing the power supply level to reduce the output radio wave intensity. In such a case, it is more preferable that the output radio wave intensity is reduced stepwise according to the security level.

As described above, when the wireless communications terminal of the first embodiment performs a contactless communications, other wireless communications are restricted based on the type of information to be exchanged in the contactless communications. Thus, it is possible to prevent radio interferences from being caused by other wireless communications concurrent with a contactless communications.

Second Embodiment

Second to fifth embodiments are each directed to an alternative example of the communications function section 400 of the wireless communications terminal 101 shown in FIG. 2. In the second to fifth embodiments, the wireless communications terminal 101 uses the same components as those of the first embodiment, except for the communications function section 400, and those components will be denoted by the same reference numerals and will not be further described below.

The basic configuration of the communications function section 400 of the wireless communications terminal 101 according to the second embodiment of the present invention is as shown in FIG. 2. The second embodiment is different from the first embodiment in that the operation of the wireless communications control section 210 can be turned ON/OFF by the user operating a button 103.

Figure 12:
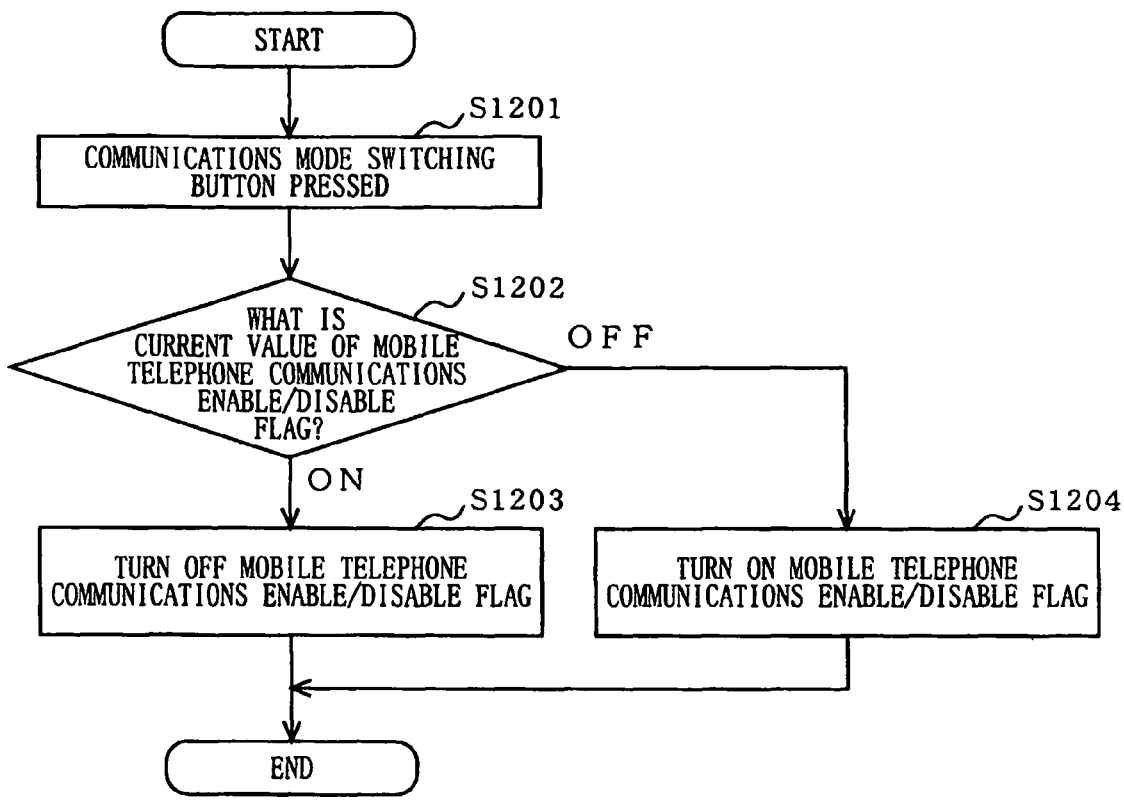
FIG. 12 is a flow chart showing a process performed by a wireless communications terminal according to a second embodiment of the present invention based on pressing of a button by a user.
Figure 13:
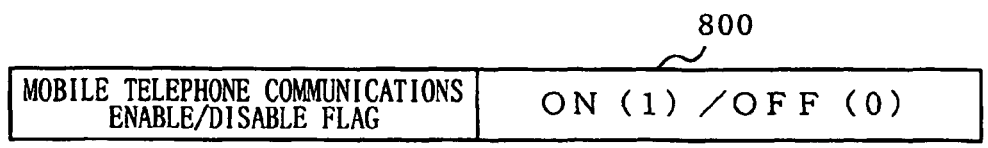
FIG. 13 shows an example of a mobile telephone communications enable/disable flag.

Referring to FIG. 12 and FIG. 13, the process performed by the wireless communications terminal 101 of the second embodiment will now be described.

Before the user establishes a contactless communications by, for example, placing the wireless communications terminal 101 over the reader/writer 105, the user checks the mobile telephone communications status of the wireless communications terminal 101. If the wireless communications terminal 101 is in a mode where the mobile telephone communications function is enabled, the user presses a designated button 103 to place the wireless communications terminal 101 in a mode where the mobile telephone communications function is disabled (step S1201). When the button input section 205 detects mode switching through the pressing of the button 103, the wireless communications terminal 101 checks a mobile telephone communications enable/disable flag 800 having a data structure as shown in FIG. 13 (step S1202). If the mobile telephone communications enable/disable flag 800 is ON (1), the wireless communications terminal 101 changes the value of the flag to OFF (0) (step S1203), and vice versa (step S1204). Through this operation, the mobile telephone communications enable/disable flag 800 is updated. The wireless communications control section 210 refers to the mobile telephone communications enable/disable flag 800, and controls the mobile telephone communications function so that the mobile telephone communications function is enabled when the flag is ON (1) and disabled when it is OFF (0).

After the contactless communications is terminated, the mobile telephone communications function is brought back to the enabled state by the user pressing the button 103 (step S1201) to change the value of the mobile telephone communications enable/disable flag 800 (steps S1202 to S1204).

As described above, with the wireless communications terminal according to the second embodiment of the present invention, the user can manually disable a communications function via the button input section of the wireless communications terminal so as to disable wireless communications other than the contactless communications. Therefore, it is possible to selectively establish only a contactless communications, thus preventing radio interferences.

Figure 14:
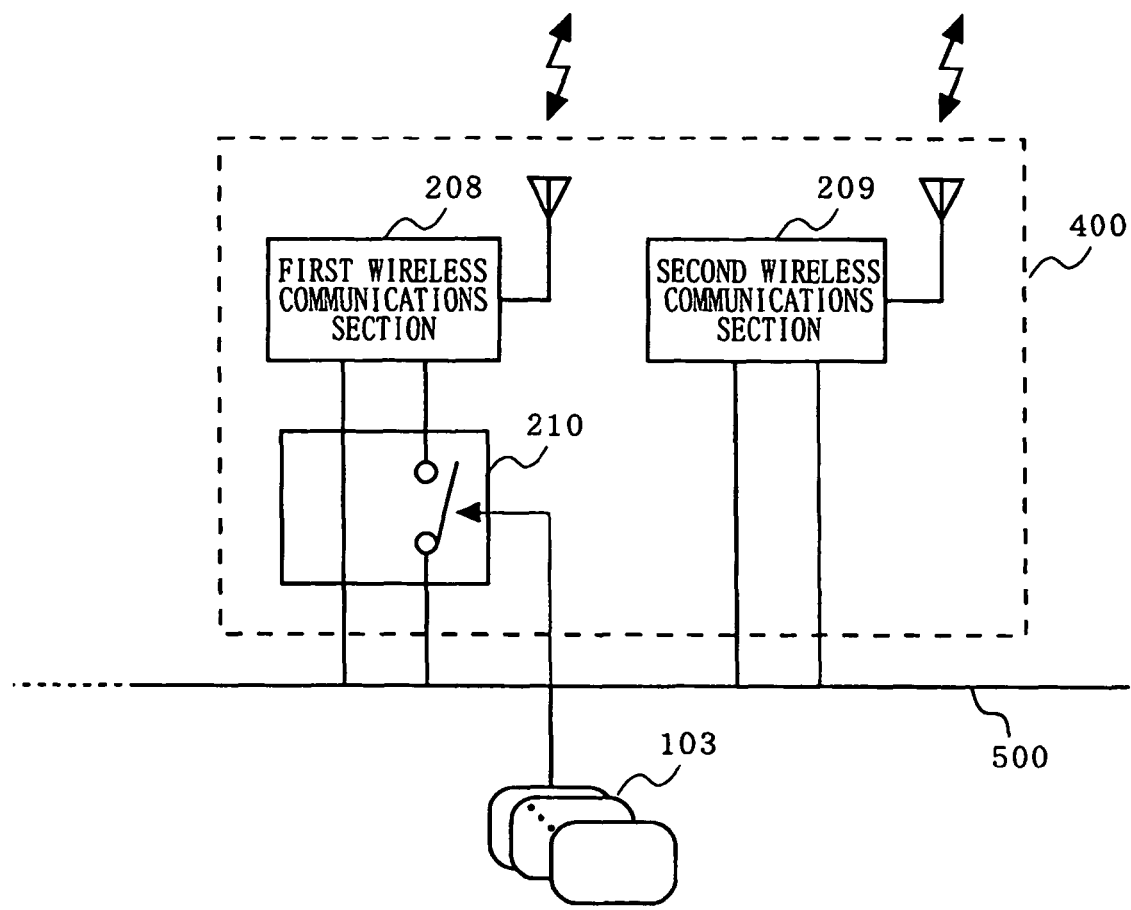
FIG. 14 shows a part of a hardware configuration of the wireless communications terminal of the second embodiment.

While the operation of the wireless communications control section 210 can be turned ON/OFF by means of software as described above, it may alternatively be done by hardware using, for example, a toggle switch (see FIG. 14).

Third Embodiment

Figure 15:
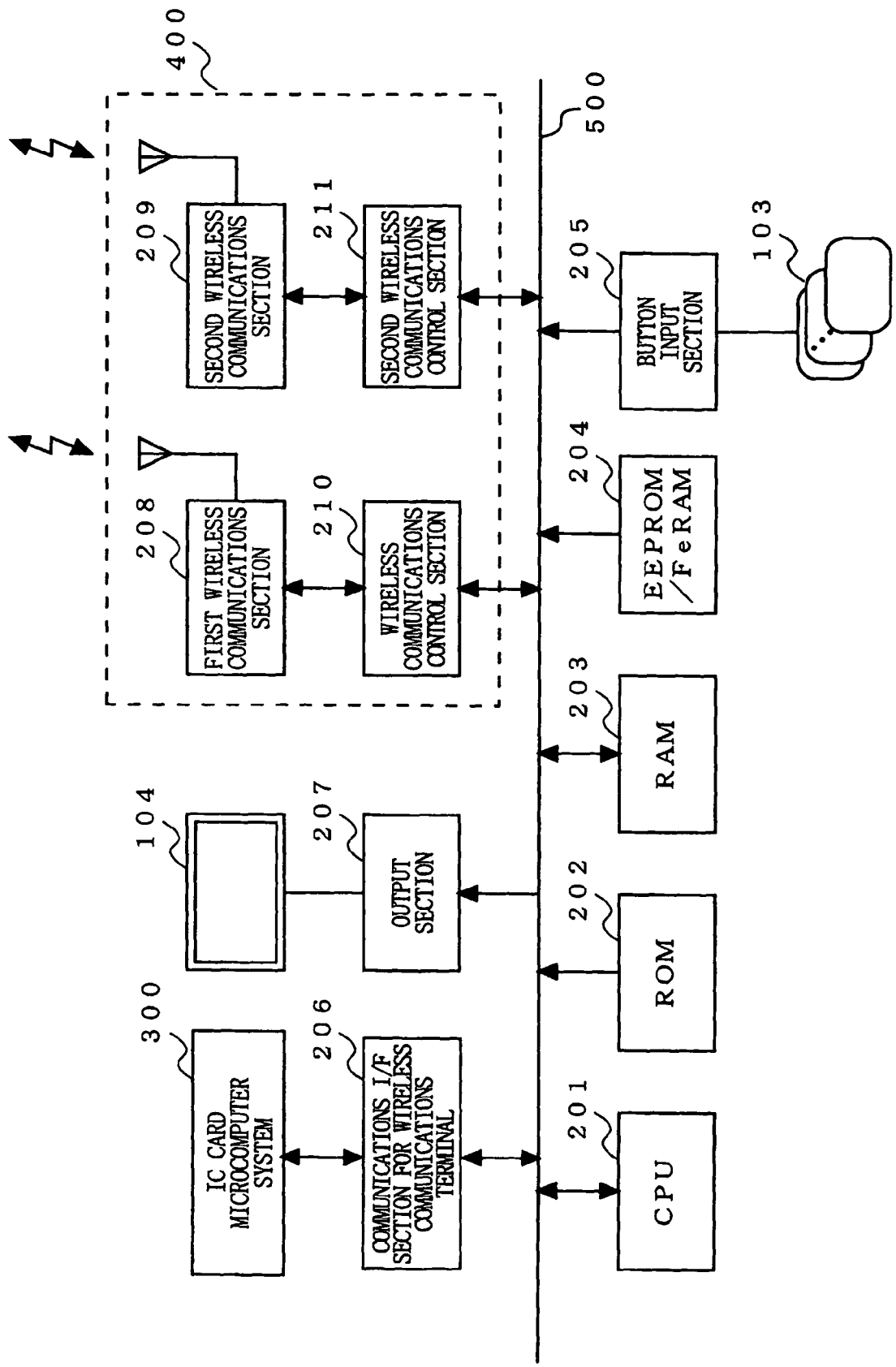
FIG. 15 shows a hardware configuration of a wireless communications terminal according to a third embodiment of the present invention.

FIG. 15 shows a configuration of the communications function section 400 of the wireless communications terminal 101 according to a third embodiment of the present invention. Referring to FIG. 15, the communications function section 400 of the wireless communications terminal 101 of the third embodiment includes the first wireless communications section 208 for performing a mobile telephone communications, the second wireless communications section 209 for performing a contactless communications, a first wireless communications control section 210 for controlling the communications status of the first wireless communications section 208, and a second wireless communications control section 211 for controlling the communications status of the second wireless communications section 209.

Figure 16:
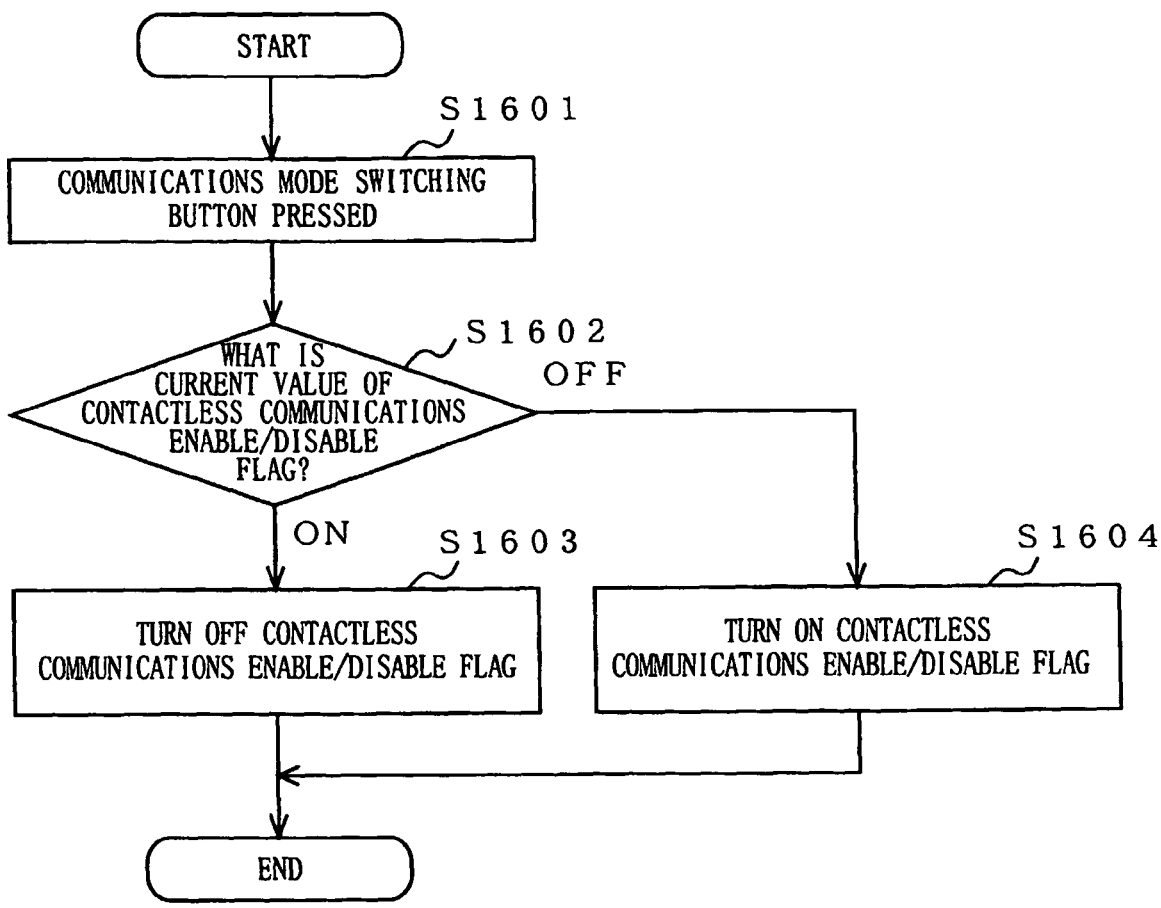
FIG. 16 is a flow chart showing a process performed by the wireless communications terminal of the third embodiment based on pressing of a button by a user.
Figure 17:
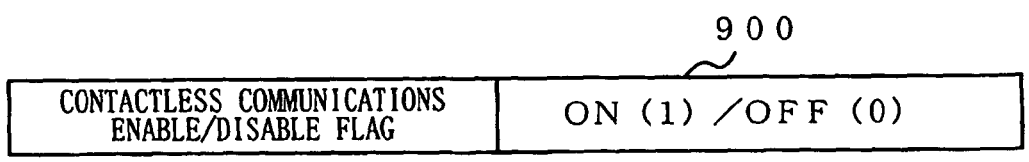
FIG. 17 shows an example of a contactless communications enable/disable flag.

Referring to FIG. 16 and FIG. 17, the process performed by the wireless communications terminal 101 of the third embodiment will now be described.

Before the user establishes a contactless communications by, for example, placing the wireless communications terminal 101 over the reader/writer 105, the user checks the mobile telephone communications status and the contactless communications status of the wireless communications terminal 101. How the wireless communications terminal 101 handles the mobile telephone communications status is as described above in the second embodiment.

If the wireless communications terminal 101 is in a mode where the contactless communications function is disabled, the user presses a designated button 103 to place the wireless communications terminal 101 in a mode where the contactless communications function is enabled (step S1601). When the button input section 205 detects mode switching through the pressing of the button 103, the wireless communications terminal 101 checks a contactless communications enable/disable flag 900 having a data structure as shown in FIG. 17 (step S1602). If the contactless communications enable/disable flag 900 is ON (1), the wireless communications terminal 101 changes the value of the flag to OFF (0) (step S1603), and vice versa (step S1604). Through this operation, the contactless communications enable/disable flag 900 is updated. The second wireless communications control section 211 refers to the contactless communications enable/disable flag 900, and controls the contactless communications function so that the contactless communications function is enabled when the flag is ON (1) and disabled when it is OFF (0).

After the contactless communications is terminated, the contactless communications function is brought back to the disabled state by the user pressing the button 103 (step S1601) to change the value of the contactless communications enable/disable flag 900 (steps S1602 to S1604).

As described above, with the wireless communications terminal according to the third embodiment of the present invention, the user can manually disable a communications function via the button input section of the wireless communications terminal so as to enable a contactless communications while disabling wireless communications other than the contactless communications. Therefore, it is possible to selectively establish only a contactless communications, thus preventing radio interferences.

Figure 18:
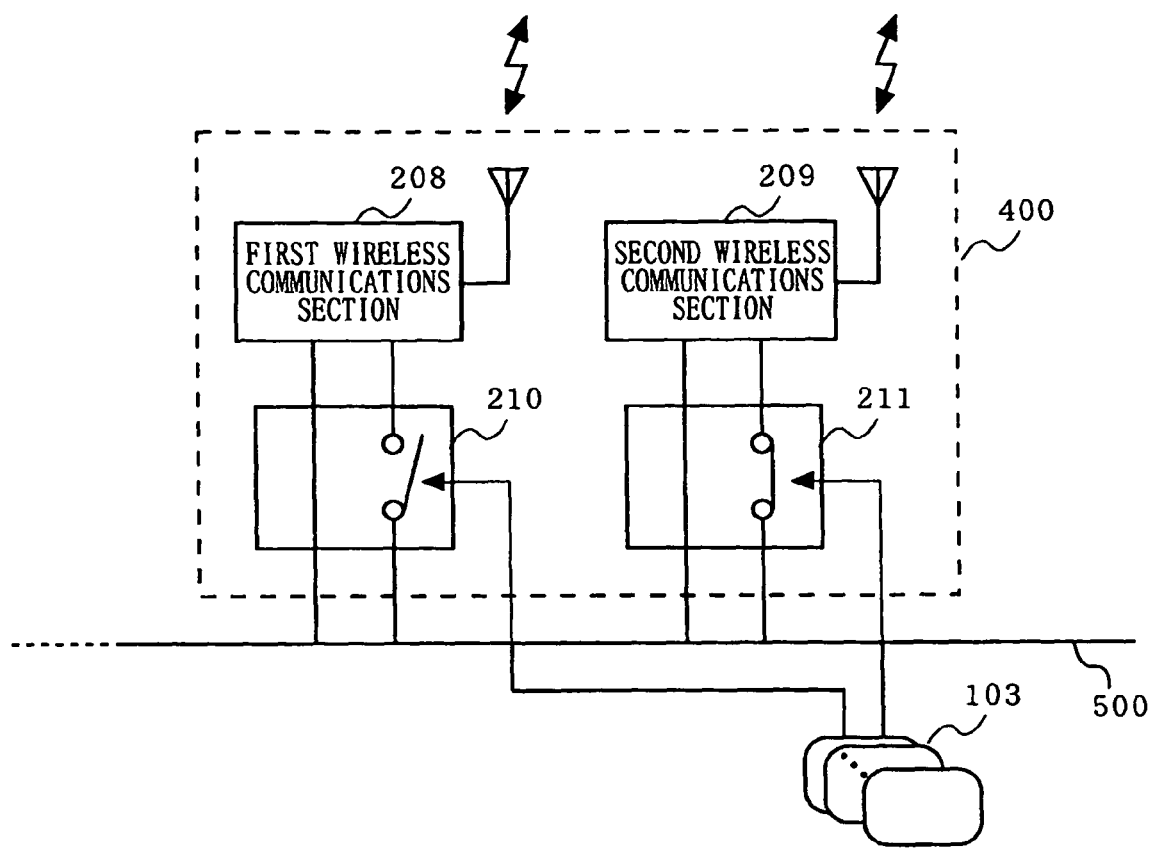
FIG. 18 shows a part of a hardware configuration of the wireless communications terminal of the third embodiment.

While the operation of the first wireless communications control section 210 and the second wireless communications control section 211 can be turned ON/OFF by means of software as described above, it may alternatively be done by hardware using, for example, a toggle switch (see FIG. 18).

Fourth Embodiment

Figure 19:
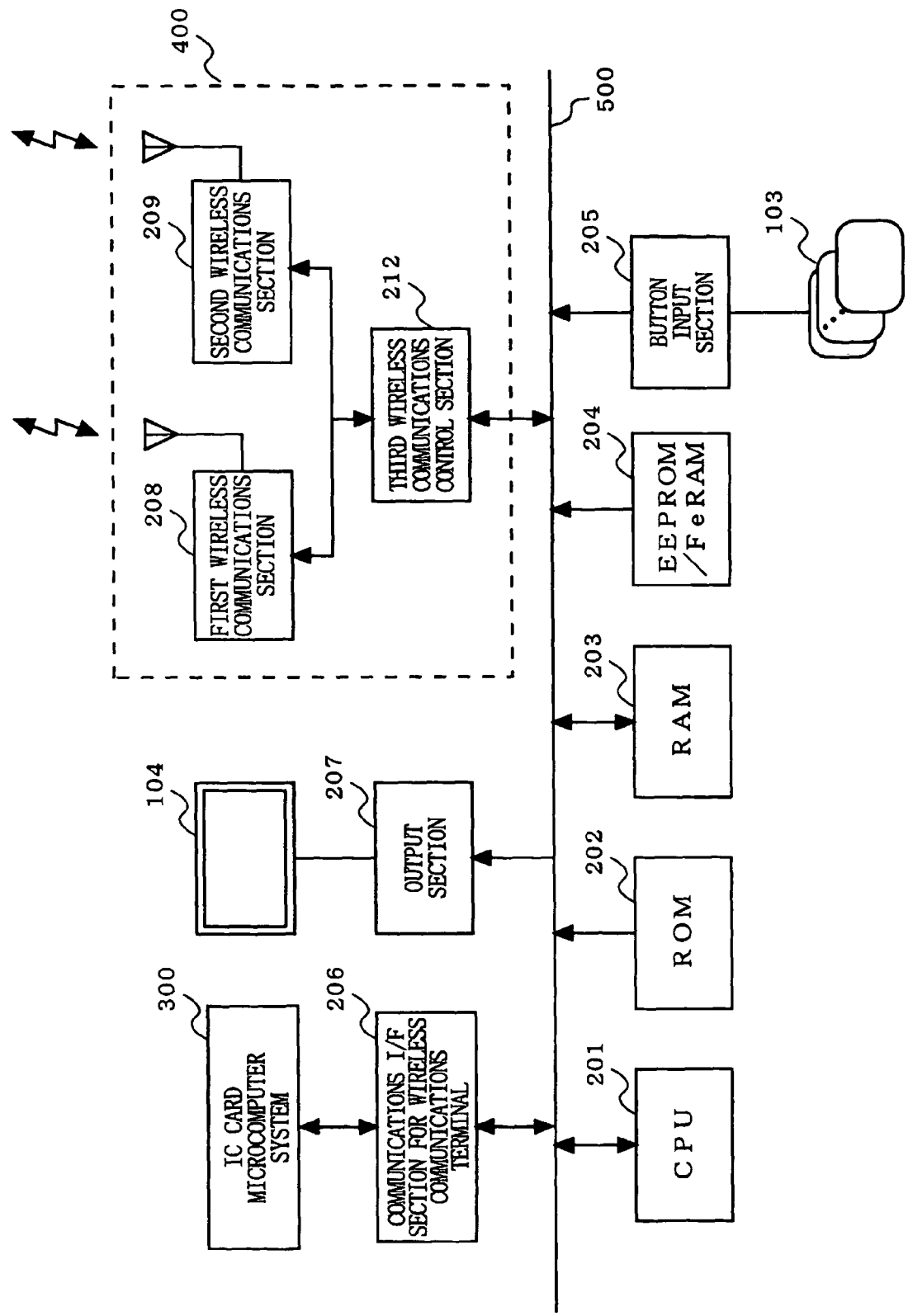
FIG. 19 shows a hardware configuration of a wireless communications terminal according to a fourth embodiment of the present invention.

FIG. 19 shows a configuration of the communications function section 400 of the wireless communications terminal 101 according to a fourth embodiment of the present invention. Referring to FIG. 19, the communications function section 400 of the wireless communications terminal 101 of the fourth embodiment includes the first wireless communications section 208 for performing a mobile telephone communications, the second wireless communications section 209 for performing a contactless communications, and a third wireless communications control section 212 for controlling both the communications status of the first wireless communications section 208 and that of the second wireless communications section 209.

In the fourth embodiment, the mobile telephone communications function and the contactless communications function are controlled together so that either one of the functions is enabled at a time, instead of being controlled separately as in the third embodiment. Therefore, based on the button 103 pressed by the user, the third wireless communications control section 212 enables the operation of either the first wireless communications section 208 or the second wireless communications section 209 while disabling the operation of the other. FIG. 20 shows an example where the operation of the third wireless communications control section 212 is turned ON/OFF by hardware using, for example, a toggle switch.

Fifth Embodiment

Figure 21:
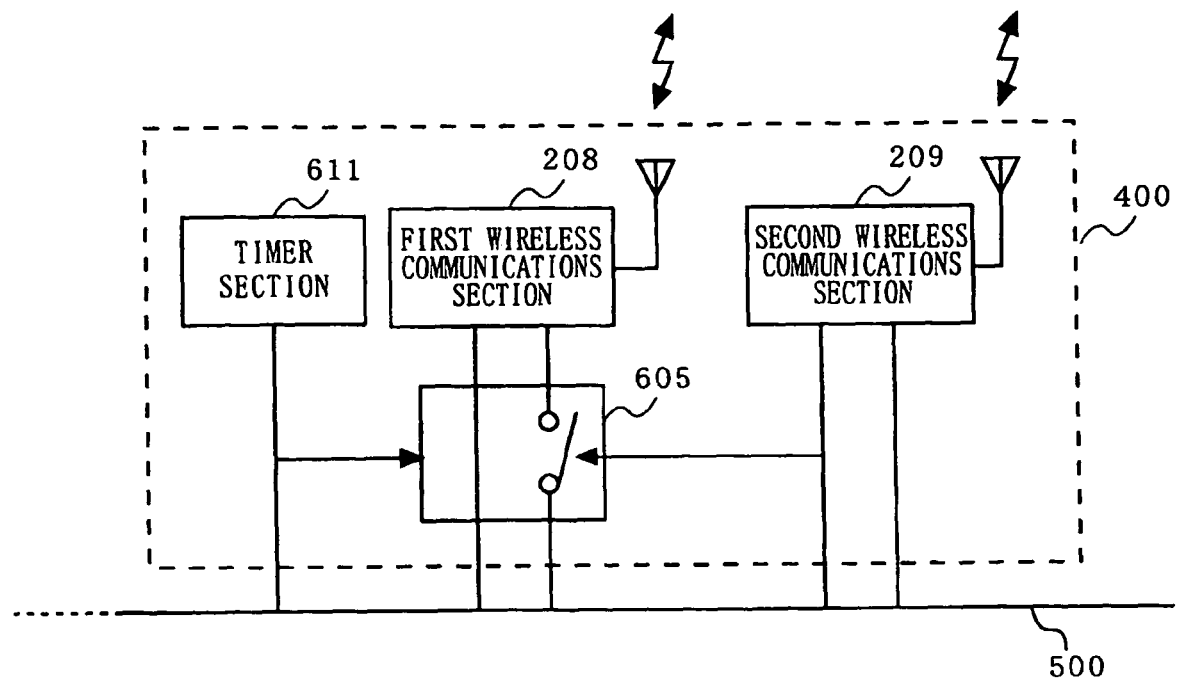
FIG. 21 shows apart of a hardware configuration of a wireless communications terminal according to a fifth embodiment of the present invention.

FIG. 21 shows a configuration of the communications function section 400 of the wireless communications terminal 101 according to a fifth embodiment of the present invention. Referring to FIG. 21, the communications function section 400 of the wireless communications terminal 101 of the fifth embodiment includes the first wireless communications section 208 for performing a mobile telephone communications, the second wireless communications section 209 for performing a contactless communications, a wireless communications control section 605 for controlling the communications status of the first wireless communications section 208 based on the communications status of the second wireless communications section 209, and a timer section 611 for providing a timer-based control of the wireless communications control section 605.

The wireless communications control section 605 automatically restricts the communications function of the first wireless communications section 208 in response to the occurrence of an event in the second wireless communications section 209. This event indicates the initiation of a contactless communications, and can easily be detected by, for example, detecting a power supply or an initial response from the reader/writer 105. How the wireless communications control section 605 restricts the communications function of the first wireless communications section 208 is as described above in other embodiments.

The timer section 611 is used for automatically bringing the communications status of the first wireless communications section 208 back to a previous, uncontrolled communications status after controlling the communications status of the first wireless communications section 208 for a period of time. The timer-based operation can be realized by keeping the amount of time for which the communications status is controlled, and automatically bringing the communications status back to a previous, uncontrolled communications status after a predetermined amount of time is elapsed.

Figure 22:
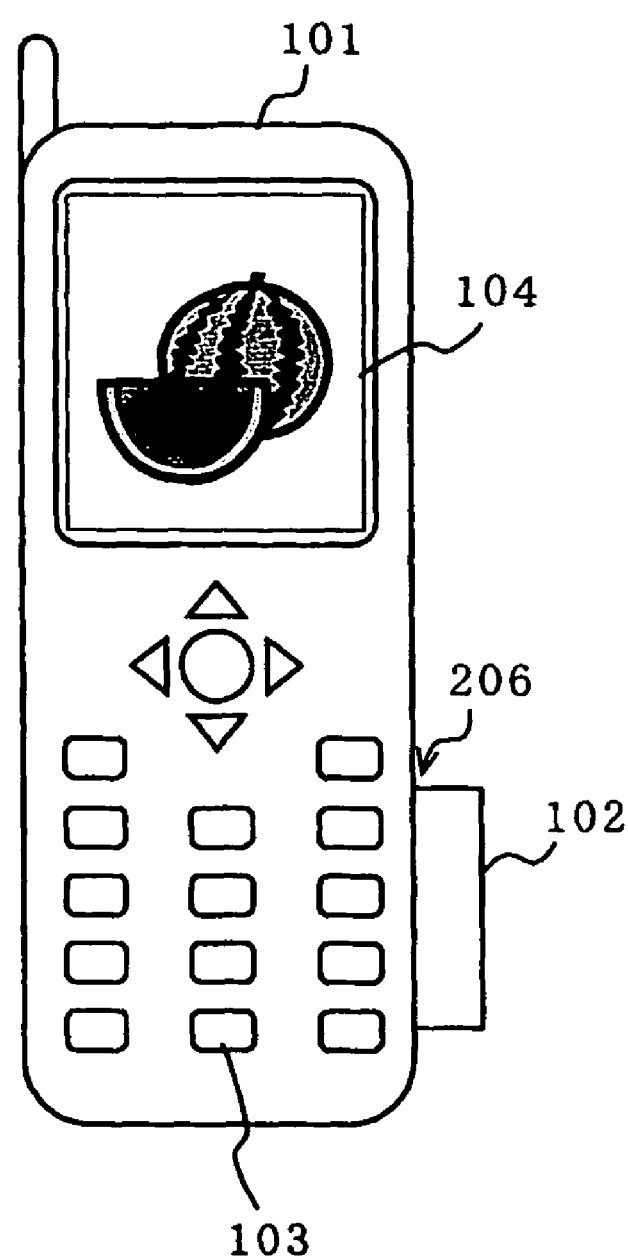
FIG. 22 shows an example of an image displayed on the wireless communications terminal of the fifth embodiment.

An indicator indicating that the wireless communications terminal 101 is in a contactless communications mode may be displayed on the display section 104 so that the user can visually check the current mode of the wireless communications terminal 101 (FIG. 22).

In other embodiments described above, the first wireless communications control section 210, the second wireless communications control section 211, the third wireless communications control section 212, etc., of the wireless communications terminal 101 are implemented in the form of a computer program. The program may be stored in a ROM of the wireless communications terminal 101 or may be downloaded from outside to a non-volatile memory.

The functional blocks described above may each be implemented in the form of an LSI being an integrated circuit by combining together hardware resources such as a CPU, a RAM, a ROM and a non-volatile memory. These functional blocks may be individually formed into a separate chip or some or all of them may be formed together into a single chip.

Figure 23:
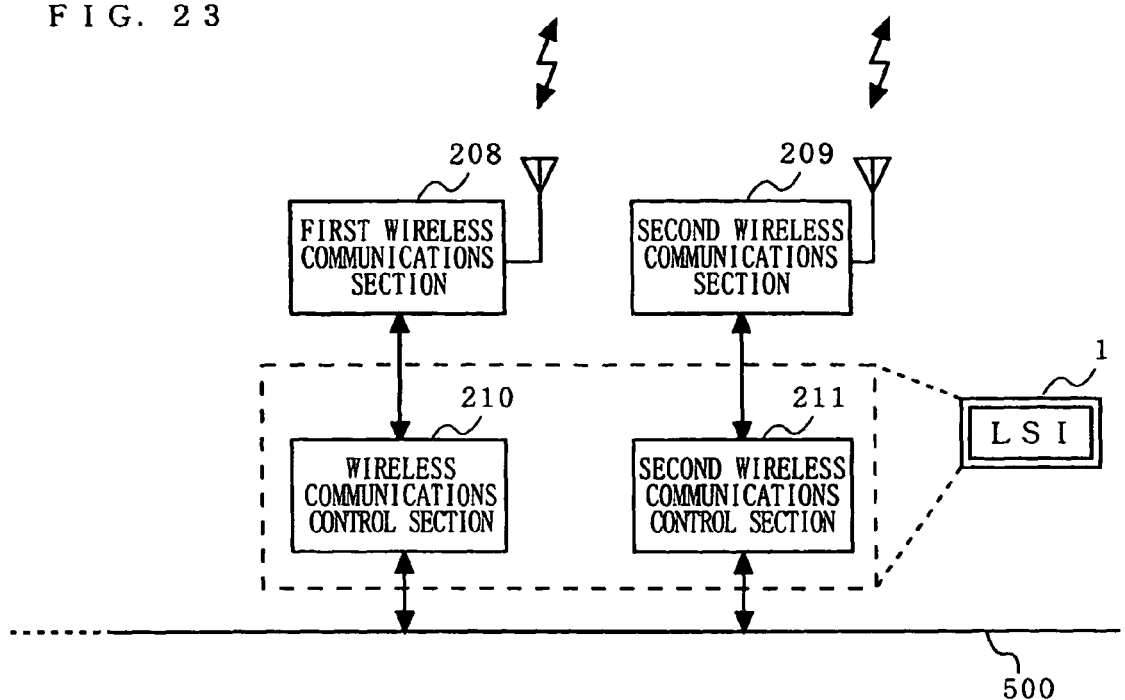
FIG. 23 shows an example of how the wireless communications terminal according to the first to third embodiments is made into an integrated circuit.
Figure 24:
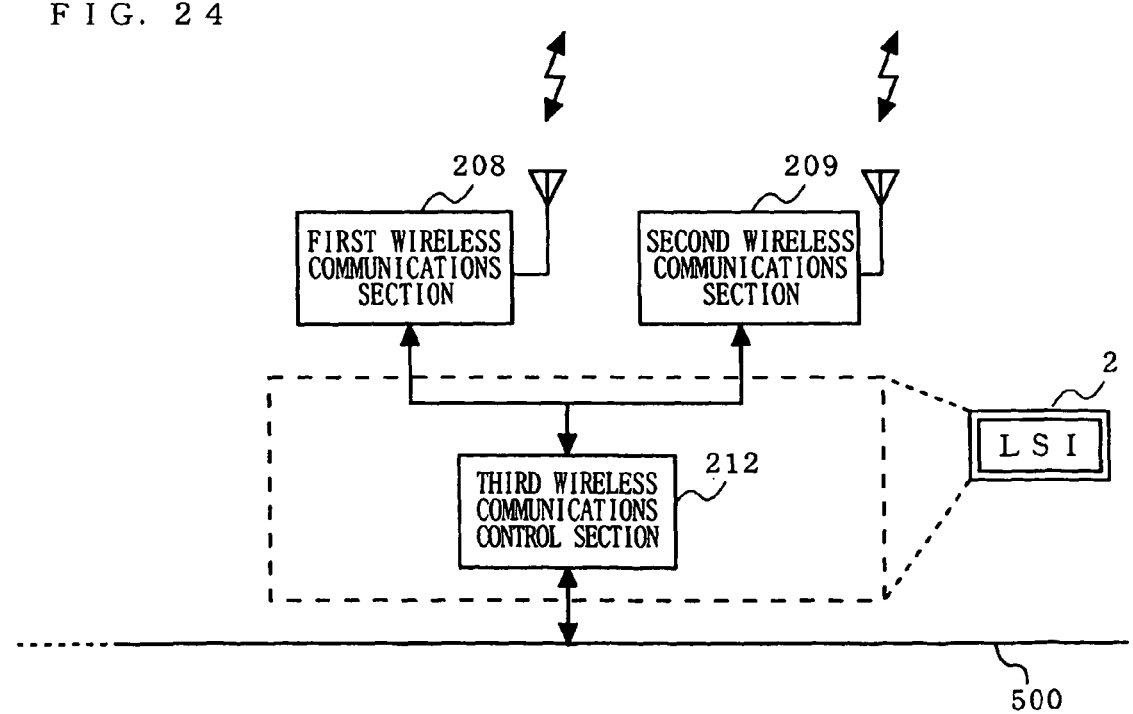
FIG. 24 shows an example of how the wireless communications terminal according to the fourth embodiment is made into an integrated circuit.

FIG. 23 and FIG. 24 each show an example of how the functional blocks are made into an integrated circuit in the first to fifth embodiments. An LSI 1 and an LSI 2 are exemplary integrated circuits, representing a functional block or functional blocks to be made into an integrated circuit. While the term "LSI" is used herein as the type of integrated circuit used in the present invention, integrated circuits are also called "ICs", "system LSIs", "super LSIs" or "ultra LSIs" depending on the degree of integration.

Moreover, the form of an integrated circuit that can be used with the present invention is not limited to an LSI, but may alternatively be a dedicated circuit or a general-purpose processor. It may alternatively be an FPGA (Field Programmable Gate Array) being programmable after the LSI is manufactured, or a reconfigurable processor in which the interconnections and settings of circuit cells in the LSI can be reconfigured.

Furthermore, if advancements in the semiconductor technology or derivative technologies bring forth a new form of circuit integration replacing LSIs, the new form of circuit integration can of course be used for the integration of the various functional blocks. Such a derivative technology may possibly be an application of biotechnology or organic chemistry, for example.

INDUSTRIAL APPLICABILITY

The present invention is applicable to a wireless communications terminal, or the like, being capable of performing a contactless communications and another wireless communications, and being capable of accommodating therein a contactless IC card. The present invention is particularly advantageous when, for example, it is desirable to prevent radio interferences from being caused by other wireless communications concurrent with a contactless communications.

The invention claimed is:

1. A mobile telephone which accommodates an IC card having a memory area for storing information regarding electronic money, the mobile telephone comprising:
    a first wireless communications section operable to perform a mobile telephone communication via a communication network;
    a second wireless communications section operable to perform a contactless communication, which is independent of the mobile telephone communication, between a reader/writer provided in an automatic ticket gate, and the IC card when the IC card is placed over the automatic ticket gate;
    a wireless communications control section;
    operable to, in the case where said second wireless communications section accesses the memory area for storing the information regarding electronic money to perform processing for exchanging the electronic money with the reader/writer, when the IC card is placed over the automatic ticket gate, determine that a contactless communication that involves highly confidential information is to be performed by said second wireless communications section, cause a mobile telephone communication function of said first wireless communications section to be in a function deactivated mode where the mobile telephone communication function is not reactivated automatically, and complete the contactless communication, performed by said second wireless communications section, that involves highly confidential information; and
    operable to in the case where said second wireless communications section performs the contactless communication without accessing the memory area for storing the information regarding electronic money, when the IC card is placed over the automated ticket gate, cause a mobile telephone communication function of said first wireless communications section to be in a temporary deactivated mode where the mobile telephone communication function is reactivated automatically, and complete the contactless communication performed by said second wireless communications section; and
    a timer section operable to start timing when said wireless communications control section causes the mobile telephone communication function of said first wireless communications section to be in the temporary deactivated mode, said timer section being used for reactivation from the temporary deactivated mode,
    wherein, at a time when a predetermined time period has elapsed in a timer operation of said timer section, said wireless communication control section automatically returns said first wireless communication section from the temporary deactivated mode to a mode where a mobile telephone communication can be performed.

2. The mobile telephone according to claim 1, wherein, when said first wireless communication section is in the function deactivated mode where a mobile telephone communication cannot be performed and when an operation of mode switching by a user is detected, said wireless communication control section switches said first wireless communications section to the mode where a mobile telephone communication can be performed.

3. A communications method used by a mobile telephone including;
    a first wireless communications section for performing a mobile telephone communication via a communications network; and a second wireless communications section for performing a contactless communication, which is independent of the mobile telephone communication, between a reader/writer provided in an automatic ticket gate, and an IC card having a memory area for storing information regarding electronic money when the IC card is placed over the automatic ticket gate, the method comprising:
    a step of determining an initiation of a contactless communication performed by the second wireless communications section;
    a wireless communication control step of:
    in the case where the second wireless communications section accesses the memory area for storing the information regarding electronic money to perform processing for exchanging the electronic money with the reader/writer, determining, at an initiation of the contactless communication, that a contactless communication that involves highly confidential information is to be performed by the second wireless communication section, causing a mobile telephone communication function of the first wireless communications section to be in a function deactivated mode where the mobile telephone communication function is not reactivated automatically, and completing the contactless communication, performed by the second wireless communications section, that involves highly confidential information; and
    in the case where the second wireless communications section performs the contactless communication without accessing the memory area for storing the information regarding electronic money, when the IC card is placed over the automated ticket gate, causing a mobile telephone communication function of the first wireless communications section to be in a temporary deactivated mode where the mobile telephone communication function is reactivated automatically, and completing the contactless communication performed by the second wireless communications section; and
    a timer step of starting timing when the mobile telephone communication function of the first wireless communications section is caused to be in a temporary deactivated mode in the wireless communication control step, the timer section being used for reactivation from the temporary deactivated mode,
    wherein the wireless communication control step includes a step of, at a time when a predetermined time period has elapsed in a timer operation of the timer section, automatically returning the first wireless communication section from the temporary deactivated mode to a mode where a mobile telephone communication can be performed.

4. A communications program stored on a computer-readable storage medium that is executed by a mobile telephone including a first wireless communications section for performing a mobile telephone communication via a communications network, and a second wireless communications section for performing a contactless communication, which is independent of the mobile telephone communication, between a reader/writer provided in an automatic ticket gate, and an IC card having a memory area for storing information regarding electronic money when the IC card is placed over the automatic ticket gate, the program causing the mobile telephone to perform the steps:

a step of determining an initiation of a contactless communication performed by the second wireless communications section;

a wireless communication control step of:

in the case where the second wireless communications section accesses the memory area for storing the information regarding electronic money to perform processing for exchanging the electronic money with the reader/writer, determining, at an initiation of the contactless communication, that a contactless communication that involves highly confidential information is to be performed by the second wireless communication section, causing a mobile telephone communication function of the first wireless communications section to be in a function deactivated mode where the mobile telephone communication function is not reactivated automatically, and completing the contactless communication, performed by the second wireless communications section, that involves highly confidential information; and in the case where the second wireless communications section performs the contactless communication without accessing the memory area for storing the information regarding electronic money, when the IC card is placed over the automated ticket gate, causing a mobile telephone communication function of the first wireless communications section to be in a temporary deactivated mode where the mobile telephone communication function is reactivated automatically, and completing the contactless communication performed by the second wireless communications section; and a timer step of starting timing when the mobile telephone communication function of the first wireless communications section is caused to be in a temporary deactivated mode in the wireless communication control step, the timer section being used for reactivation from the temporary deactivated mode.

wherein the wireless communication control step includes a step of, at a time when a predetermined time period has elapsed in a timer operation of the timer section, automatically returning the first wireless communication section from the temporary deactivated mode to a mode where a mobile telephone communication can be performed.

5. An integrated circuit used in a mobile telephone which accommodates an IC card having a memory area for storing information regarding electronic money, the mobile telephone including a first wireless communications section for performing a wireless communication via a communications network, and a second wireless communications section for performing a contactless communication, which is independent of the mobile telephone communication, between a reader/writer provided in an automatic ticket gate, and the IC card when the IC card is placed over the automatic ticket gate, the integrated circuit comprising:

a circuit functioning as a wireless communications control section:

operable to, in the case where the second wireless communications section accesses the memory area for storing the information regarding electronic money to perform processing on exchanging the electronic money with the reader/writer, when the IC card is placed over the automatic ticket gate, determine that a contactless communication that involves highly confidential information is to performed by the second wireless communications section, cause a mobile telephone communication function of the first wireless communication function of the first wireless communications section to be in a function deactivated mode where the mobile telephone communication function is not reactivated automatically, and complete the contactless communication, performed by the second wireless communications section, that involves highly confidential information; and operable in the case where the second wireless communications section performs the contactless communication without accessing the memory area for storing the information regarding electronic money, when the IC card is placed over the automated ticket gate, cause a mobile telephone communication function of the first wireless communications section to be in a temporary deactivated mode where the mobile telephone communication function is reactivated automatically, and complete the contactless communication performed by the second wireless communications section; and a circuit functioning as a timer section operable to start timing when the wireless communications control section causes the mobile telephone communication function of the first wireless communications section to be in the temporary deactivated mode, the timer section being used for reactivation from the temporary deactivated mode, wherein, at a time when a predetermined time period has elapsed in a timer operation of the timer section, the wireless communication control section automatically returns the first wireless communication section from the temporary deactivated mode to a mode where a mobile telephone communication can be performed.

* * * * *

UNITED STATES PATENT AND TRADEMARK OFFICE
CERTIFICATE OF CORRECTION

PATENT NO. : 7,796,949 B2
APPLICATION NO. : 10/553008
DATED : September 14, 2010
INVENTOR(S) : Yuka Matsushita et al.

It is certified that error appears in the above-identified patent and that said Letters Patent is hereby corrected as shown below:

In column 13, claim 4, line 44, "mode." should read --mode,--.

Signed and Sealed this
Twenty-second Day of February, 2011

David J. Kappos
*Director of the United States Patent and Trademark Office*